US005765805A

United States Patent [19]

Kennedy

[11] Patent Number: 5,765,805

[45] Date of Patent: Jun. 16, 1998

[54] LOW PROFILE GENERATOR SET BRACKET

[76] Inventor: Gino W. Kennedy, 800 SE. 7th Ave., Pompano Beach, Fla. 33060

[21] Appl. No.: 808,880

[22] Filed: Feb. 28, 1997

[51] Int. Cl.$^6$ .......... F16M 5/00

[52] U.S. Cl. .......... 248/674

[58] Field of Search .......... 248/674, 675, 248/637, 300

[56] References Cited

U.S. PATENT DOCUMENTS 2,662,988 12/1953 McKim .......... 248/674 X 4,441,684 4/1984 Credle, Jr. .......... 248/674

5,598,680 2/1997 Wilhelmi .......... 248/300 X

*Primary Examiner*—Ramon O. Ramirez

*Attorney, Agent, or Firm*—McHale & Slavin, PA

[57] ABSTRACT

A generator support bracket for use in positioning a generator in close proximity to a horizontally oriented internal combustion engine. The support bracket replaces the engine inspection cover and allows for the direct coupling of a generator to the support bracket, and thus the engine. The direct coupling provides unit rigidity eliminating the need for an independent baseplate and allows for the use of a timing belt without the need for belt adjustment, as commonly used in engine/generator combinations.

7 Claims, 2 Drawing Sheets

LOW PROFILE GENERATOR SET BRACKET

FIELD OF THE INVENTION

This invention is directed to the field of generator sets, and in particular, to a combination engine access cover and generator support bracket that allows for the direct coupling of a generator to an internal combustion engine for minimizing space, weight and vibration, and maximizing rigidity.

BACKGROUND INFORMATION

Generators are used to convert mechanical energy into electrical energy. Generator sets are formed from internal combustion engines which are coupled to an electric motor that is rotated in such a direction so as to produce electricity. The generator set can be used to provide electricity in remote locations and allow for operation of power tools, televisions, refrigerators, air conditioners, and so forth. Generator sets may be used in a temporary environment to replace or supplement existing power supplies. In most such instances, the need for a compact, lightweight generator set is necessary to allow for ease of storage, transportation, and setup.

In addition, generator sets are also permanently mounted in portable structures, such as recreation vehicles and marine vessels. In these structures the generator set allows for the production of electricity when the vehicle or vessel is moving or stopped at a location where land or shore power is not possible.

Generators need to be sized to handle a particular electrical load which, in many instances, results in a space positioning problem. The allowable space on a recreational vehicle and marine vessel is critical and must be conserved. For example, a generator used in a recreation vehicle requires the designer to typically reduce the size of the generator to accommodate a particular spatial environment or alternatively limit the amount of usable interior space if a particular generator is required.

Weight is also a concern since even a hundred pounds can cause a problem with either a recreational vehicle or marine vessel. For instance, adding a generator set to the back of a small marine vessel, such as a 35' boat, can cause handling problems which can be further exasperated if the mounting hardware for the generator set adds an inordinate amount of weight. The baseplate for a generator and engine can easily exceed one hundred pounds without the generator and engine mounted.

Generator sets also have a problem with vibration. This problem is especially noticeable when used in a recreational or vessel configuration. In a marine setting, the vibration problem is especially noticeable and requires large isolation mounts if the vibration is to be isolated. For this reason, marine vessels require the generator and engine combination be isolated in such a manner so as to absorb the vibrations to prohibit resonant sounds from transferring throughout the vessel, but also inhibit misalignment between the engine and the generator. For these reasons, the generator and engine are typically mounted on a heavy baseplate wherein a belt couples the engine to the generator for use in rotating of the generator armature. If the generator is misaligned, the flex in the operating belt may cause slippage and improper operation of the generator. This in turn may cause electrical devices coupled to the generator to receive power lags or surges, either of which can be detrimental to the circuitry of an electrical device. Thus, the mounting of a generator and an engine results in a large usage of space due to the separation between the components. The base support to secure the two components must also be strong enough in order to provide a vibration free separation between the components.

Various efforts have been made to address the weight, size and vibration problems associated with generator sets. For instance, manufacturers have attempted to reduce weight by employing lighter engine materials, however, the weight reduction is minimal in light of the years of engine refinements. The size has also been addressed by making the engine more compact and, to which this invention is addressed, placing the engine in a horizontal position to reduce the overall height. Although such an arrangement lowers the height providing a low profile, the arrangement does not lessen the length of the generator set and typically increases it. For example, a horizontally positioned engine such as the Kubota is capable of providing a seven, horsepower motor operating on four cycles with a height of less than fifteen inches. This low profile type motor is then available for coupling to a generator by use of an interconnecting belt, all of which is placed upon a rigid platform. Thus, what is needed in the art is a low profile generator set that allows for the direct coupling of a generator to an internal combustion engine for minimizing space, weight and vibration.

SUMMARY OF THE INVENTION

The instant invention is a combination engine inspection plate and generator support bracket for use with horizontally disposed engines. The bracket allows for a direct coupling of a generator to the engine. In this manner, the inspection plate of the engine is replaced with the support bracket that includes provisions for coupling to a generator. The support bracket eliminates the need for a common bare plate and, by direct coupling to the generator, eliminates the need for a belt tensioner and generator alignment.

The support plate is machined to accept a low pressure gasket seal with through holes provided that match the crankcase inspection plate hole pattern. The support bracket may include a provision for draining oil through the bracket to facilitate oil removal directly from the bracket cover, without removing of the cover. A second set of holes is provided for securement of the generator to the opposite side surface of the support bracket. The support bracket may also be used to support the generator the engine by use of an angle support that couples to the bottom of the support bracket. The angle support can then be secured directly to isolation mounting hardware.

In a second embodiment, the support bracket may include a bridge that extends the spacial distance of the plate to allow placement of the generator a fixed distance from the engine but remain directly coupled to the engine. The bridge allows the direct coupling yet provides sufficient distance for securing various components to the engine to avoid further engine modification.

Thus, an object of the instant invention is to provide a compact generator set by eliminating the need for a common horizontal baseplate by use of a vertical support bracket that replaces the inspection plate and operates as a support plate for a generator.

Yet still another object of the instant invention is to provide a direct coupling of a generator to an engine wherein the use of a toothed style belt eliminates the need for belt adjustment.

Still another object of the instant invention is to teach direct coupling between a generator and an engine yet allow for extension by use of a bridge to accommodate various engine components.

Yet still another object of the instant invention is to teach the use of a vertical support plate that allows for the coupling to a horizontally disposed isolation mount.

Other objects and advantages of this invention will become apparent from the following description taken in conjunction with the accompanying drawings, wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention will be described in terms of a first and second embodiment, it will be readily apparent to those skilled in this art that various modifications, rearrangements, and substitutions can be made without departing from the spirit of the invention. The scope of the invention is defined by the claims appended hereto.

Figure 1:
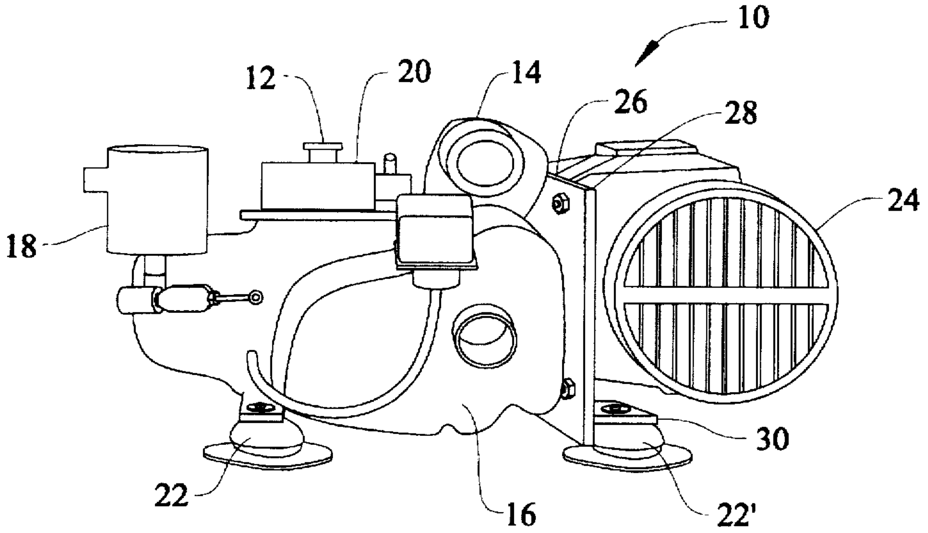
FIG. 1 is a pictorial view of a horizontal engine with a generator mounted directly to the motor by use of the instant support bracket.

Now referring to FIG. 1, set forth is a pictorial of a generator set 10 having a horizontally disposed engine 12 such as that manufactured by the Kubota Corporation, which is a self contained engine having a starter 14, crank case 16, air cleaner 18, and fuel injection system 20. The crank case 16 has forward isolation mounts 22 with mounting holes that allow securement directly to a recreational vehicle or a marine vessel. Generator 24 is shown coupled directly to the crank case 16 by use of the support bracket 26 of the instant invention.

The support bracket 26 is constructed from an aluminum plate having a thickness of about a ⅜'s of an inch. The support bracket 26 is defined by a first side surface having a first set of holes positioned for lining the plate in a vertical orientation to the hold-down support 28 of the generator 24. The second side surface of the plate 26 has a second set of through-holes mounted for aligning the plate into the inspection plate mounting holes of the crank case 16. In this embodiment, the isolation mount 30 is coupled directly to the support bracket 26 and allows for positioning of isolation mounts 22', thereby providing a four point isolation mount with two isolation mounts 22 located at the front of the engine and two isolation mounts 22' located at the back of the engine.

Figure 2:
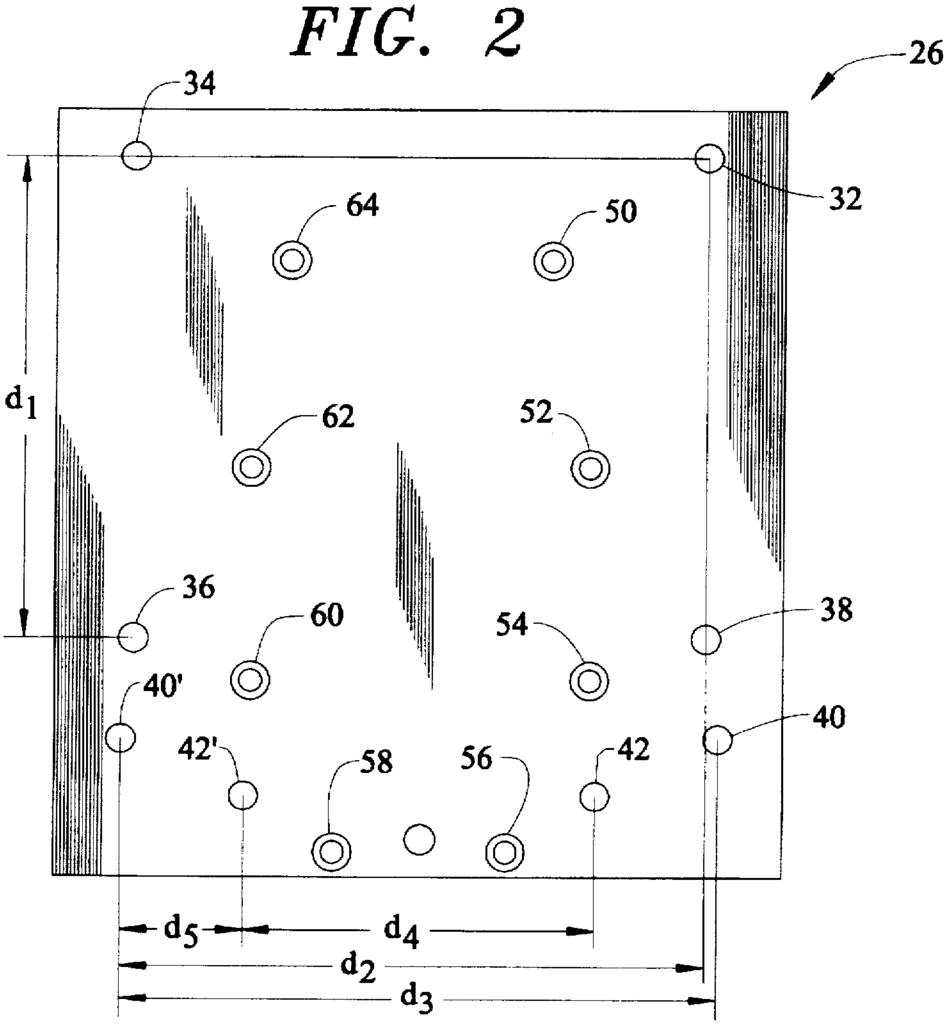
FIG. 2 is a top plane view of a first embodiment of the instant support bracket.

By way of illustration, the support bracket forms 26 forms a combination baseplate and inspection cover thereby eliminating the need for the inspection cover, as well as the horizontally positioned base plate typically employed Referring to FIG. 2, the support bracket 26 is shown in more detail. The bracket support bracket 26 is approximately nine inches by ten inches wide and three-eighths inch thick for most mounting situations. It is noted that the plate may be made out of light weight aluminum for all support is directed to the engine, which only serves to further seal the bottom of the engine. The plate consists of generator mounting holes 32, 34, 36, and 38 for use in coupling to the generator. The mounting holes can be tapped for studs or a nut and bolt arrangement may be employed. A spatial distance between generator mounting holes 32–34 and 36–38 is $D_1$ of approximately 6.3 inches. Spatial distance between generator mounting holes 32–38 and 34–36 is $D_2$ of approximately 7.3 inches. Mounting holes 40, 40', 42 and 42' are available for placement of an angled bracket 30 in order to support two isolation mounts 22. As previously shown in FIG. 1, the isolation mounts 22' may be coupled to the support bracket 26 by use of angled bracket 30 secured to 40 and 42 along one side and 40' and 42' on the opposite side. The support bracket 26 utilizes engine mounting holes 50–64 which provides a direct replacement for the engine inspection cover. In this manner, a gasket may be placed over the holes 50–64 and the plate bolted directly to the engine, thereby causing direct replacement for the engine inspection cover.

Figure 3:
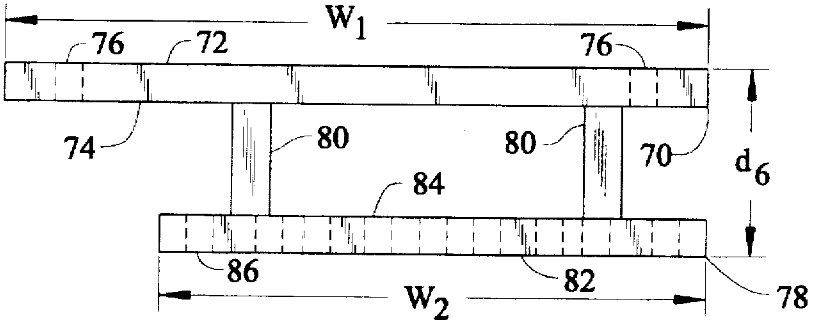
FIG. 3 is a side view of a second embodiment of the instant invention which illustrates an offset support bracket arrangement.
Figure 4:
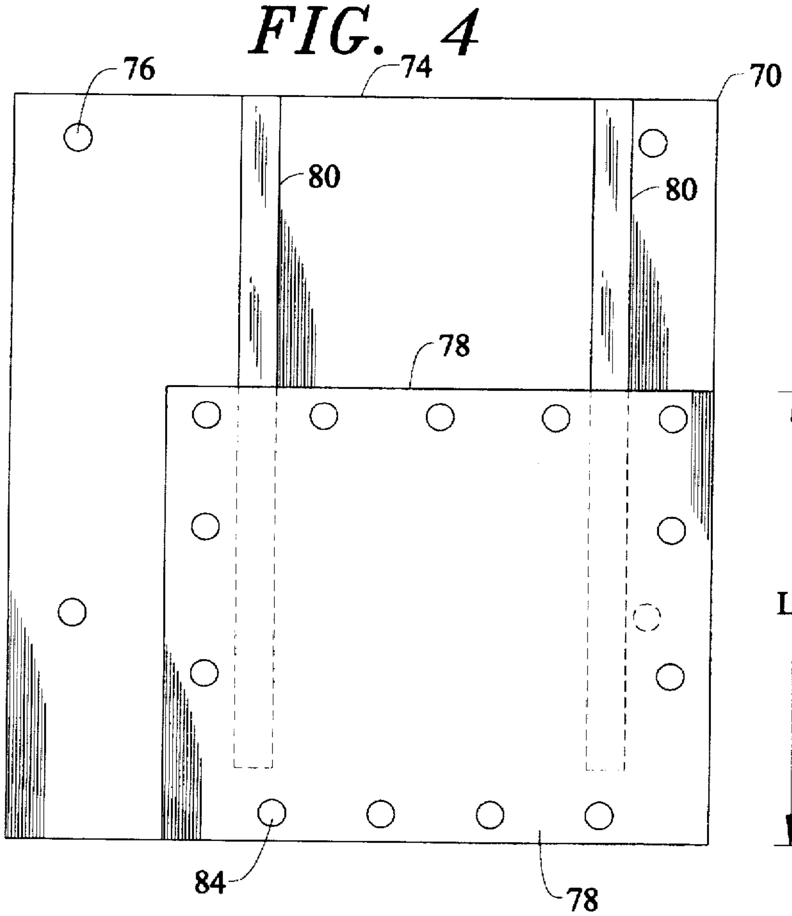
FIG. 4 is a top plane view of the second embodiment.
Figure 5:
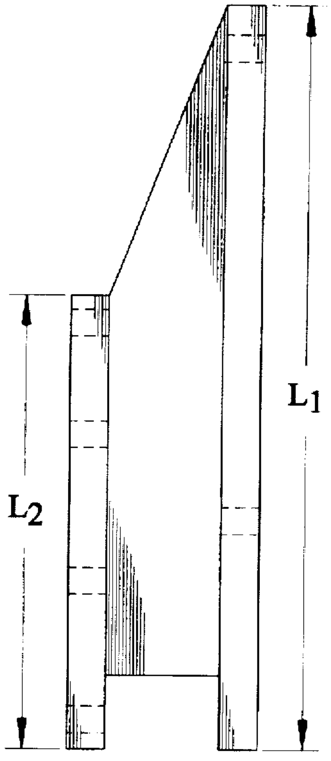
FIG. 5 is a side view of FIG. 4.

Now referring to FIG. 3, set forth is a second embodiment to the instant invention having a first rigid metal plate 70, having a first side surface 72, and a second side surface 74. The first plate 70 has a plurality of through-holes 76 for lining the first plate 70 in a vertical orientation to the hold-down support of a generator. The width of the plate $W_1$ is approximately ten inches and in this embodiment a second plate 78 is set a fixed distance $D_6$ by use of spacers 80 which operate as a bridge between the plates 70 and 78. The second plate 78 has first side surface 82 and a second side surface 84. The second plate 78 has through-holes 86 strategically positioned for lining the plate to the inspection plate mounting holes of a horizontally oriented engine. As shown in FIG. 4, the first plate 70 is similar to the first embodiment having mounting holes 76 located around the perimeter edge for use in support of the generator. However, in this embodiment, spacers 80 raise the second plate 78 a distance above the second surface 74 of the first plate 70 so as to position the generator a fixed distance from the engine for those engines that require clearance for starters, sensors or other devices that have not been rerouted, or are preferably placed along the rear of the engine. The upper support plate 78 includes the necessary mounting holes 84 for attachment to the engine and, as referenced in FIG. 5, the length L2 is approximately six inches leaving an enlarged area for placement of the aforementioned accessories to the engine. The length L1 of the first plate is approximately ten inches suitable for securement of most generator plates. In this embodiment, the engine is typically of a size to have its own isolation mounts, but it should be noted that isolation mounts could be mounted to the support bracket if necessary.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. A generator support bracket forming a combination base plate and engine inspection cover, said support bracket comprising: a rigid metal plate having a first side surface and a second side surface; said plate having a first set of through holes strategically positioned for aligning said first side of said plate in a vertical orientation to a generator; a second set of through holes strategically positioned for aligning said second side of said plate to replace an inspection plate of a horizontally orientated engine; an angled bracket secured to said plate for coupling said plate to isolation mounts; and a plurality of fasteners for securing a generator to said plate and said plate to an engine.

2. The support bracket according to claim 1 wherein said plate is constructed from aluminum having a thickness of about ⅜ inch.

3. The support bracket according to claim 1 wherein said plate has a width of about 9 inches and a length of about 10 inches.

4. A generator support bracket comprising: a first rigid metal plate having a first side surface and a second side surface, said first plate having through holes strategically positioned for aligning said first side of said first plate in a vertical orientation to a generator; a plurality of fasteners for securing the generator to said first plate; a second rigid metal plate having a first side surface and a second side surface, said second plate having through holes strategically positioned for aligning said second side of said plate to replace an inspection plate of a horizontally orientated engine; an angled bracket secured to said second plate for coupling said support bracket to isolation mounts; spacer means for positioning said second plate a fixed distance from said first plate; and a plurality of fasteners for securing the second plate to the engine.

5. The support bracket according to claim 4 wherein said plates are constructed from aluminum having a thickness of about ⅜ inch.

6. The support bracket according to claim 5 wherein said first plate is approximately 7 inches square.

7. The support bracket according to claim 5 wherein said first side surface of said first plate is spaced apart from said first side surface of said second plate approximately 2½ inches.

* * * * *